(12) United States Patent
Nicholson et al.

(10) Patent No.: US 9,672,340 B2
(45) Date of Patent: Jun. 6, 2017

(54) SECURE HANDWRITING INPUT FOR PASSWORD FIELDS

(71) Applicant: LENOVO (Singapore) PTE, LTD., New Tech Park (SG)

(72) Inventors: John Weldon Nicholson, Cary, NC (US); Scott Edwards Kelso, Cary, NC (US); Steven Richard Perrin, Raleigh, NC (US); Jianbang Zhang, Raleigh, NC (US)

(73) Assignee: Lenovo (Singapore) PTE. LTD, New Tech Park, Singapore (SG)

( * ) Notice: Subject to any disclaimer, the term of this patent is extended or adjusted under 35 U.S.C. 154(b) by 0 days.

(21) Appl. No.: 14/453,940

(22) Filed: Aug. 7, 2014

(65) Prior Publication Data

US 2016/0042165 A1  Feb. 11, 2016

(51) Int. Cl.
| | |
|---|---|
| *G06F 21/00* | (2013.01) |
| *G06F 21/32* | (2013.01) |
| *G06K 9/00* | (2006.01) |
| *G06K 9/18* | (2006.01) |
| *G06K 9/22* | (2006.01) |

(52) U.S. Cl.
CPC ......... *G06F 21/32* (2013.01); *G06K 9/00865* (2013.01); *G06K 9/18* (2013.01); *G06K 9/222* (2013.01); *G06F 2221/031* (2013.01)

(58) Field of Classification Search
CPC ........ G06F 21/31; G06F 21/83; G06F 21/606; G06F 2221/2141; G06F 2221/2113; G06F 21/32; G06F 2221/031; G06Q 20/3552; H04N 7/17345; H04N 21/812; H04N 21/42204; H04N 21/41407; G06K 9/222; G06K 9/18; G06K 9/00865
See application file for complete search history.

(56) References Cited

U.S. PATENT DOCUMENTS

| | | | | |
|---|---|---|---|---|
| 5,341,438 | A * | 8/1994 | Clifford | ......................... 382/179 |
| 2004/0189620 | A1* | 9/2004 | Roh | ..................... G06F 3/03545 |
| | | | | 345/179 |
| 2005/0246588 | A1* | 11/2005 | Deng | ..................... G06F 11/302 |
| | | | | 714/38.14 |

(Continued)

*Primary Examiner* — Don Zhao
(74) *Attorney, Agent, or Firm* — Kunzler Law Group

(57) ABSTRACT

For secure handwriting input for password fields, an apparatus for using a tone indicator to identify language in text recognition is disclosed. The apparatus may include a processor, a handwriting input unit operatively coupled to the processor, a display operatively coupled to the processor, a handwriting element module that identifies a handwriting element from handwriting input, an input replication module that controls the display to present the handwriting element, and a privacy module that controls the display to obscure the handwriting element in response to a predetermined trigger event. Obscuring the handwriting element may include removing the handwriting element, rendering transparent the handwriting element, replacing the handwriting element and an area surrounding the handwriting element with a colored area, and/or replacing the handwriting element with an anonymizing symbol. A method and computer program product also perform the functions of the apparatus.

20 Claims, 6 Drawing Sheets

(56) References Cited

U.S. PATENT DOCUMENTS

| | | | |
|---|---|---|---|
| 2006/0005039 A1* | 1/2006 | Hsieh | G06F 21/36 713/183 |
| 2006/0085761 A1* | 4/2006 | Allen | G06F 17/243 715/780 |
| 2006/0215360 A1* | 9/2006 | Lin et al. | 361/685 |
| 2007/0033647 A1* | 2/2007 | Yang | G06F 21/83 726/18 |
| 2008/0229230 A1* | 9/2008 | Grigoriev et al. | 715/780 |
| 2009/0160800 A1* | 6/2009 | Liu et al. | 345/173 |
| 2009/0235197 A1* | 9/2009 | Chen et al. | 715/780 |
| 2009/0260077 A1* | 10/2009 | Zhu | G06F 21/34 726/19 |
| 2010/0053661 A1* | 3/2010 | Ushiku | G06K 15/005 358/1.14 |
| 2010/0289746 A1* | 11/2010 | Tojima et al. | 345/168 |
| 2010/0318807 A1* | 12/2010 | Wang | G06F 21/31 713/184 |
| 2011/0234516 A1* | 9/2011 | Nakajima et al. | 345/173 |
| 2011/0298709 A1* | 12/2011 | Vaganov | G06F 3/03546 345/158 |
| 2012/0287089 A1* | 11/2012 | Shiota | G06F 3/03545 345/179 |
| 2013/0263288 A1* | 10/2013 | Palanichamy et al. | 726/30 |
| 2014/0019855 A1* | 1/2014 | Kim et al. | 715/268 |
| 2014/0310805 A1* | 10/2014 | Kandekar | 726/19 |
| 2014/0365949 A1* | 12/2014 | Xia et al. | 715/780 |
| 2015/0022468 A1* | 1/2015 | Cha | G06F 3/0416 345/173 |

* cited by examiner

000
SECURE HANDWRITING INPUT FOR PASSWORD FIELDS

FIELD

The subject matter disclosed herein relates to handwriting input and more particularly relates to systems, apparatuses, and methods for secure handwriting input for password fields.

BACKGROUND

Description of the Related Art

Touchscreen devices are popular and widely sold. Smartphones, tablet computers, and other touchscreen devices often lack a physical keyboard for textual input. As such, handwriting recognition software is gaining popularity as a way to input text into a touchscreen device. However, handwriting as an input method suffers a lack of "over the shoulder" security when used to enter passwords. Additionally, many input method editors (IMEs) disable the handwriting mode for password fields, and force the user to use the soft keyboard, which may be unwieldy.

BRIEF SUMMARY

An apparatus for secure handwriting input for password fields is disclosed. A method and computer program product also perform the functions of the apparatus.

The apparatus may include a processor, a handwriting input unit operatively coupled to the processor, a display operatively coupled to the processor, a handwriting element module that identifies a handwriting element from handwriting input, an input replication module that controls the display to present the handwriting element, and a privacy module that controls the display to obscure the handwriting element in response to a predetermined trigger event. In certain embodiments, the apparatus includes an input mode module that enables a handwriting mode for input into a password field.

The handwriting element may include an element selected from the group consisting of: a handwriting stroke, a handwritten character, and a pixel corresponding to the handwriting input. Controlling the display to obscure the handwriting element may include controlling the display to perform an action selected from the group consisting of: removing the handwriting element, rendering transparent the handwriting element, changing a color of the handwriting element to a background color, replacing the handwriting element and an area surrounding the handwriting element with a colored area, and replacing the handwriting element with an anonymizing symbol.

In certain embodiments, the apparatus includes a handwriting input module that receives the handwriting input, and a password field module that determines whether the handwriting input is associated with a password field. The apparatus may further include a trigger event module that monitors for the predetermined trigger event in response to the input replication module presenting the handwriting element and indicates an occurrence of the predetermined trigger event to the privacy module.

In certain embodiments, the apparatus includes a character recognition module that recognizes a handwritten character from the handwriting input, and a text character module that inputs, into a password field, a text character corresponding to the recognized handwritten character, wherein the privacy module obscures one or more previously entered text characters in response to the text character module inputting a subsequent text character. The character recognition module may determine whether a continuous stroke of the handwriting input comprises more than one handwritten character.

In certain embodiments, the apparatus includes a timer module that initiates in response to presenting the handwriting element and send an indication to the privacy module when a predetermined amount of time expires, wherein the predetermined trigger event comprises the timer module determining an expiration of the predetermined amount of time. In certain embodiments, the apparatus includes a handwriting element counter that tracks a number of handwriting elements presented, wherein the predetermined trigger event comprises the handwriting element counter determining that a predetermined number of subsequent handwriting elements have been presented.

The method may include identifying, by use of a processor, a handwriting element based on handwriting input for a password field, displaying the handwriting element on a display, and controlling the display to obscure the handwriting element in response to a predetermined trigger event. Controlling the display to obscure the handwriting element comprises controlling the display to perform an action selected from the group consisting of: removing the handwriting element, rendering transparent the handwriting element, changing a color of the handwriting element to a background color, replacing the handwriting element and an area surrounding the handwriting element with a colored area, and replacing the handwriting element with an anonymizing symbol. The trigger event may include an event selected from the group consisting of: passage of a predetermined amount of time and identifying a predetermined number of subsequent handwriting elements.

In certain embodiments, the method includes recognizing a handwritten character corresponding to the handwriting input, and inputting, into a password field, a text character corresponding to the handwritten character. The method may also include displaying the text character in the password field, and obscuring one or more previously entered text characters in response to the predetermined trigger event. In some embodiments, the text character is obscured in response to the same trigger event as the handwritten character. For example, the text character and handwriting elements corresponding to the handwritten character may be simultaneously obscured. In other embodiments, the text character is obscured a predetermined period after the handwritten character. For example, the text character and the handwritten character may be synchronously obscured such that the text character is obscured an offset amount of time after the handwritten character.

The computer program product may include a computer readable storage medium that stores code executable by a processor to perform receiving handwriting input for a password field, identifying a handwriting element based on handwriting input for a password field, displaying the handwriting element on a display, and controlling the display to obscure the handwriting element in response to a predetermined trigger event.

In certain embodiments, the computer program product includes code to recognize a handwritten character corresponding to the handwriting input, code to input, into a password field, a text character corresponding to the handwritten character, and code to display the text character in the password field. One or more previously entered text characters may be obscured in response to detecting the trigger event.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
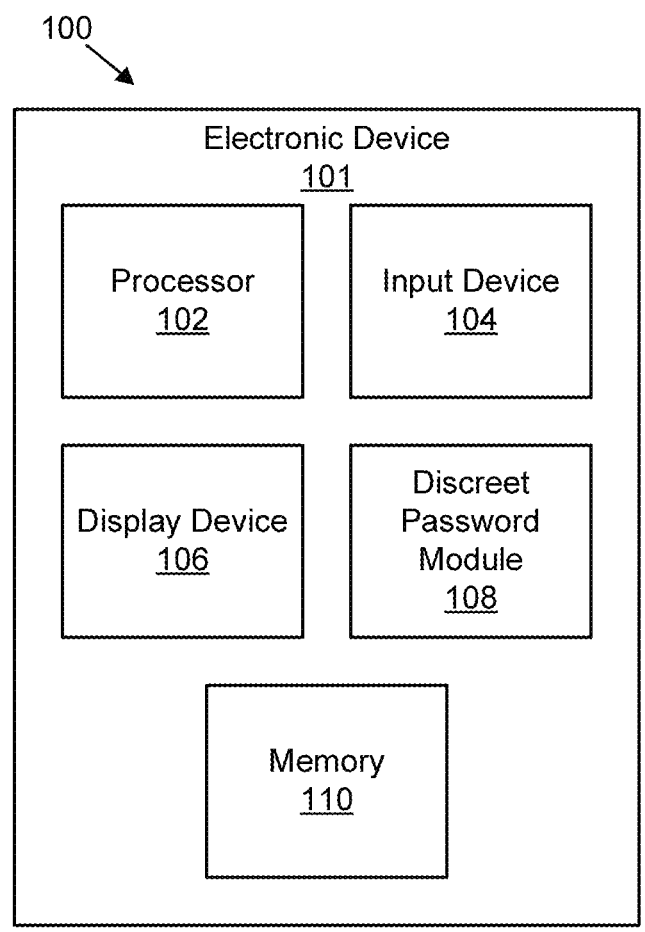
FIG. 1 is a schematic block diagram illustrating one embodiment of a system for secure handwriting input for password fields.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products identify handwriting elements associated with a password field, replicate the handwriting elements onto a display, and obscure the handwriting elements in response to a predetermined trigger event, thereby preserving the confidentiality of the password from third-party observers. In some embodiments, the predetermined trigger event includes subsequent input of a predetermined number of additional handwriting elements. In some embodiments, the predetermined trigger event includes expiration of a timer. According to a one embodiment, only the most recent handwritten character is visible on the screen. The character will fade from view as the user enters a next character. According to another embodiment, a trail of digital "ink" is left behind the stylus or digital pen for a threshold amount of time. Upon reaching the threshold amount of time, the pixels of the digital "ink" disappear causing a tracer-like visual effect.

FIG. 1 depicts a system 100 for secure handwriting input for password fields, according to embodiments of the disclosure. The system 100 includes an electronic device 101. The electronic device 101 comprises a processor 102, an input device 104, a display device 106, a discreet password module 108, and a memory 110. The components of the electronic device 101 may be communicatively coupled to each other, for example via a computer bus.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 110 to perform the methods and routines described herein. The processor 102 is communicatively coupled to the input device 104, the discreet password module 108, the display device 106, and the memory 110.

The input device 104, in one embodiment, may comprise any known computer input device including a touch panel, a button, a keyboard, or the like. For example, the input device 104 may be a handwriting input unit operatively coupled to the processor 102. In some embodiments, the input device 104 may be integrated with the display device 106, for example, as a touchscreen or similar touch-sensitive display. In some embodiments, the input device 104 comprises a touchscreen and text may be input by using a virtual keyboard displayed on the touchscreen and/or by handwriting on the touchscreen. In some embodiments, the input device 104 comprises two or more different devices, such as a keyboard and a touch panel.

The display device 106, in one embodiment, may comprise any known electronic display capable of outputting visual data to a user. For example, the display device 106 may be an LCD display, an LED display, an OLED display, a projector, or similar display device capable of outputting images, text, or the like to a user. In some embodiments, the display device 106 may be integrated with the input device 104, for example, as a touchscreen or similar touch-sensitive display. The display device 106 may receive data for display from the processor 102 and/or the discreet password module 108.

The discreet password module 108, in one embodiment, receives handwriting input from the input device 104 associated with a password field, identifies a handwriting element from handwriting input, controls the display device 106 to present the handwriting element, and controls the display device 106 to obscure the handwriting element in response to a predetermined trigger event, thereby preserving the confidentiality of the password from third-party observers. In some embodiments, the discreet password module 108 monitors for the predetermined trigger event in response to presenting the handwriting element.

In certain embodiments, the handwriting element is a character (e.g., a letter or a numeral) and the discreet password module 108 identifies the character, for example using a character recognition algorithm. The discreet password module 108 may then input the identified character into the password field and obscure one or more previously entered characters responsive to inputting the identified character. Examples of characters identifiable by the discreet password module 108 include, but are not limited to, a letter, a number, a symbol, or the like. In some embodiments, the discreet password module 108 identifies an ASCII-code character, a Unicode character, or similar standardized computer-readable character that corresponds to the handwriting element.

The discreet password module 108 may be comprised of computer hardware, computer software, or a combination of both computer hardware and computer software. For example, the discreet password module 108 may comprise circuitry, or a processor, configured to receive handwriting input and/or obtain metadata. As another example, the discreet password module 108 may comprise computer program code that allows the processor 102 to obscure a handwriting element associated with a password field. The discreet password module 108 is discussed in further detail with reference to FIG. 2, below.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to secure handwriting input for password fields. For example, the memory 110 may store handwriting input, identified characters, and/or display data. The memory 110 may further store program code and data. In some embodiments, the memory 110 also stores an operating system operating on the electronic device 101.

Figure 2:
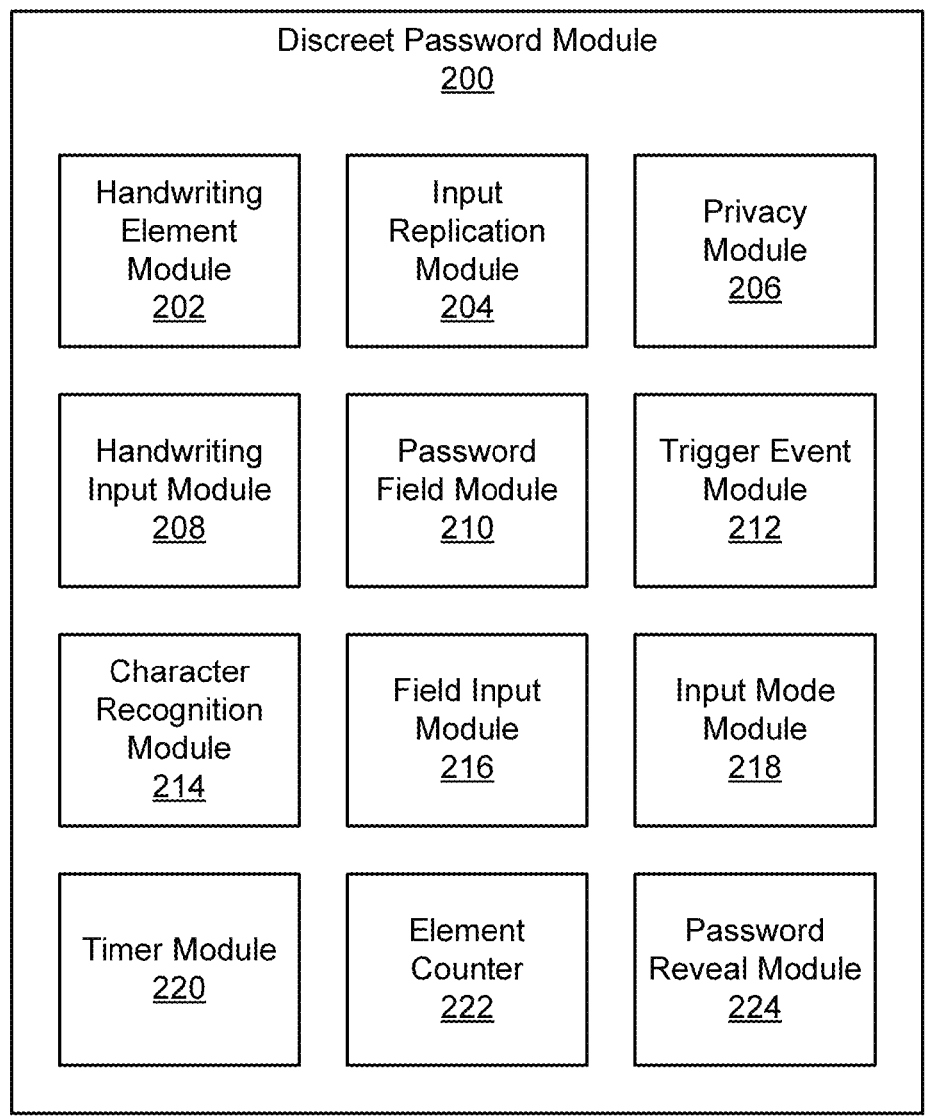
FIG. 2 is a schematic block diagram illustrating one embodiment of an apparatus for secure handwriting input for password fields.

FIG. 2 depicts a discreet password module 200 for secure handwriting input for password fields, according to embodiments of the disclosure. In some embodiments, the discreet password module 200 may be similar to, and perform the same functions as, the discreet password module 108 described above with reference to FIG. 1. In general, as described above, the discreet password module 200 receives handwriting input for a password field, identifies and displays a handwriting element of the handwriting input, and obscures the handwriting element in response to a predetermined trigger event. In one embodiment, the discreet password module 200 includes a handwriting element module 202, an input replication module 204, and a handwriting privacy module 206. In some embodiments, the discreet password module 200 also includes one or more of a handwriting input module 208, a password field module 210, a trigger event module 212, a handwriting character module 214, a field input module 216, an input mode module 218, a timer module 220, an element counter 222, and/or a password reveal module 224. The modules of the discreet password module 200 may be communicatively coupled to one another.

The handwriting element module 202, in one embodiment, is configured to identify a handwriting element from handwriting input associated with a password field. As used herein, handwriting element refers to a component of handwritten input. The handwritten input may take the form of script, character, numerals, and/or symbols. In certain embodiments, a handwriting elements includes one or more of: a stroke, a line, a mark, a character, a letter, or the like. In some embodiments, a handwriting element includes one or more pixels of a digital representation of the handwriting input. For example, a digital image of the handwriting input may comprise pixels corresponding to strokes, lines, marks, characters, and/or letters of the handwritten input.

In some embodiments, the handwriting element module 202 monitors handwriting input received, such as from the input device 104, to identify each handwriting element as it is received. For example, the handwriting element module 202 may identify each stroke of the handwriting input as it is received. In certain embodiments, the handwriting input comprises a plurality of letters and the handwriting element module 202 identifies each letter of the handwriting element as it is received from the input device 104. In certain embodiments, the handwriting input comprises a sequence of characters and the handwriting element module 202 identifies each character as it is received by the input device 104.

In some embodiments, the handwriting element module 202 separates the handwriting input into a plurality of handwriting elements. For example, the handwriting element module 202 may separate a handwritten word into a plurality of letters or into a plurality of strokes. In certain embodiments, the handwriting element module 202 may identify a handwriting element within the handwriting input based on time and/or position data associated with the handwriting input.

In some embodiments, the handwriting element module 202 may use time data associated with a plurality of handwriting strokes to distinguish one handwritten character from another. For example, timestamps associated with handwriting strokes may be used to distinguish a letter composed of a single stroke from a letter composed of a plurality of strokes. The timestamps of adjacent stokes may be compared to each other and/or to a threshold when distinguishing one handwriting character from another.

In some embodiments, the handwriting element module 202 may use location data associated with a plurality of handwriting strokes to distinguish one handwriting character from another. For example, handwriting strokes separated by a predetermined distance may be determined to be separate letters. As another example, handwriting strokes that overlap or that are contained within a common area may be considered as a single character or letter.

In some embodiments, the handwriting element module 202 may use acceleration data associated with a plurality of handwriting strokes to identify handwriting elements. In certain embodiments, the acceleration data is based on time data and location data associated with the plurality of handwriting strokes. The acceleration data may be compared to a model, a profile, and/or a threshold to distinguish one handwriting element from another. For example, the acceleration data of handwritten cursive text may be compared to model or profile to identify separate letters within the handwritten cursive text.

In some embodiments, the handwriting element module 202 may use pressure data associated with handwriting input to identify handwriting elements. In certain embodiments, pressure data may be used to identify when a handwriting input device, such as a stylus or digital pen, is lifted, thereby distinguishing one handwriting stroke from another. In some embodiments, the handwriting element module 202 may analyze pressure to determine whether a continuous stroke of handwriting input includes more than one handwritten character. For example, one or more letters within the handwriting text may be joined (e.g., as cursive writing) and thereby represented with a single, continuous stroke. The pressure data may be used to identify separate letters within handwritten cursive text.

In some embodiments, the handwriting element module 202 may perform handwriting recognition analysis on the identified handwriting elements to convert (e.g., translate) the handwriting elements into characters, letters, and/or symbols that are usable within a computer and/or text-processing applications. In other embodiments, the handwriting element module 202 may forward the identified handwriting elements to a handwriting recognition engine which for conversion computer usable characters, letters, and/or symbols.

In some embodiments, the handwriting element module 202 determines whether the handwriting input is associated with a password field. For example, the handwriting element module 202 may compare the location of the handwriting input with the onscreen location of the password field to determine whether the handwriting input belongs to the password field. As another example, the handwriting element module 202 may compare an onscreen cursor location with the onscreen location of the password field to determine whether the handwriting input belongs to the password field.

The input replication module 204, in one embodiment, is configured to present the handwriting element to a user via a display, such as the display device 106. In some embodiments, the input replication module 204 controls the display 106 to present the handwriting element. In certain embodiments, the input replication module 204 replicates the location of handwriting input with respect to a displayed interface, such as a graphical user interface (GUI). For example, where the display device 106 comprises a touchscreen, the input replication module 204 may display one or more pixels corresponding to each location on the touchscreen where handwriting input is received. The input replication module 204 presents the handwriting elements in the same order they are received by the handwriting element module 202.

In certain embodiments, the input replication module 204 maps the handwriting input to an on screen location. For example, if the handwriting input is received via a digitizing tablet, the input replication module 204 may map a location on the digitizing tablet to an onscreen location and display the handwriting element at an onscreen location corresponding to the location on the digitizing tablet where the handwriting input was received. In some embodiments, the input replication module 204 receives location data associated with a plurality of handwriting strokes from the handwriting element module 202.

The handwriting privacy module 206, in one embodiment, is configured to obscure the handwriting element responsive to a trigger event. As used herein, obscuring the handwriting element refers to controlling the display 106 to remove, replace, disguise, or otherwise render unintelligible the handwriting element. In some embodiments, the privacy module 206 controls the display to change a color of the handwriting element to a background color. For example, the handwriting element may be rendered transparent to the background. In some embodiments, the privacy module 206 controls the display to replace the handwriting element and an area surrounding the handwriting element with a colored area. The replaced area, in one embodiment, is sufficient in size to render the handwriting element unintelligible to an observer. In some embodiments, the privacy module 206 controls the display to replace the handwriting element with an anonymizing symbol. In some embodiments, the privacy module 206 removes the handwriting element from the display.

In some embodiments, the privacy module 206 monitors for the predetermined trigger event, wherein the privacy module 206 obscures the handwriting element in response to a predetermined trigger event. In some embodiments, the privacy module 206 monitors in response to the input replication module 204 displaying the handwriting element. In some embodiments, the trigger event is user selectable. For example, the user may be prompted to select a trigger event and the user's selection may be saved in the memory 110. As another example, the user may select the trigger event via a menu, the selection being stored to memory 110.

The trigger event may include a type of event and a number of events needed to trigger. In some embodiments, the type of event includes the input of a subsequent handwriting element and/or the passage of time (e.g., the expiration of a timer). For example, the trigger event may be the input of a subsequent character, wherein the privacy module 206 obscures any previously input character responsive to detect the input of the subsequent text character. As another example, the trigger event may be the input of a threshold number of pixels, wherein the privacy module 206 obscures an oldest pixel when the threshold is reached. Thereafter, the privacy module 206 may obscure an oldest pixel for each newly input pixel, thereby maintaining the number of pixels displayed at the threshold number.

In some embodiments, the trigger event is the expiration of a timer associated with the handwriting element. For example, upon identification by the handwriting element module 202 of each handwriting element of the handwriting input, a timer may be associated with the handwriting element and may begin counting down. Upon expiration of a timer, the privacy module 206 may obscure the handwriting element associated with the timer. Examples of handwriting elements associated with the timer include a handwriting stroke, a handwritten character or letter, or a pixel associated with the handwriting input.

In some embodiments, the privacy module 206 obscures the replicated handwriting input by fading the handwriting element in steps until the replicated handwriting element is no longer visible against the background. In some embodiments, the replicated handwriting element is faded to match a GUI behind the replicated handwriting element. In other embodiments, the handwriting element and an area surrounding the replicated handwriting element are both faded to a particular color or pattern. As used herein, fading refers to changing from one color to another in a series of discrete steps. In some embodiments, the fading comprises few steps such that the fade occurs quickly. In other embodiments, the fading comprises many steps such that the fade occurs slowly.

In some embodiments, the privacy module 206 is configured to obscure a computer-readable character and one or more corresponding handwriting elements in response to the same trigger event. For example, the handwriting element module 202 may recognize the handwriting element as corresponding to a particular letter and input the particular letter into the password field. In response to the trigger event associated with the handwriting elements, the privacy module 206 may obscure both the handwriting elements and the corresponding letter. In some embodiments, the privacy module 206 obscures the handwriting element and the corresponding letter in different manners. For example, the handwriting element may be removed from the display while the corresponding letter may be replaced with an anonymizing character, such as a dot or star.

In some embodiments, the privacy module 206 obscures the computer-readable character at the same time as the corresponding handwriting elements. For example, the computer-readable character and a corresponding handwriting character may be simultaneously obscured. In other embodiments, the privacy module 206 obscures the computer-readable character a predetermined period after the corresponding handwritten elements. For example, the computer-readable character and a corresponding handwritten character may be synchronously obscured such that the computer-readable character is obscured an offset amount of time after the handwritten character.

In some embodiments, the privacy module 206 determines whether the handwriting input is associated with a password field and only obscures handwriting elements associated with the password field. In certain embodiments, the privacy module 206 compares the location of the handwriting input with the onscreen location of the password field to determine whether the handwriting input is associated with the password field. In certain embodiments, the privacy module 206 compares an onscreen cursor location with the onscreen location of the password field to determine whether the handwriting input is associated with the password field.

The handwriting input module 208, in one embodiment, is configured to receive handwriting input from a handwriting input device, such as the input device 104. In some embodiments, the handwriting element module 202 parses the handwriting input to identify separate words, characters, or strokes. In some embodiments, the handwriting input module 208 creates a digital image of the handwriting input for processing by the handwriting element module 202 and/or the character recognition module 214. While depicted as a separate module, in one embodiment the handwriting input module 208 is a component of the handwriting element module 202.

In certain embodiments, the handwriting input module 208 determines whether the handwriting input is associated with a password field. For example, the handwriting element module 202 may compare the location of the handwriting input with the onscreen location of the password field to determine whether the handwriting input belongs to the password field. As another example, the handwriting element module 202 may compare an onscreen cursor location with the onscreen location of the password field to determine whether the handwriting input belongs to the password field.

In some embodiments, the handwriting input module 208 identifies a position and a time associated with each handwriting element (e.g., handwriting stroke) of the handwriting input. The handwriting input module 208, in one embodiment, may identify the position of a particular handwriting relative to a password input field, to an onscreen location, and/or to other handwriting elements. In some embodiments, the position may be a beginning position, an ending position, or the like. In other embodiments, the position may be an area encompassed by the handwriting element or a vector representing the handwriting element.

The password field module 210, in one embodiment, is configured to determine whether the handwriting input is associated with a password field. In some embodiments, the password field module 210 identifies input fields of a displayed interface and determines whether a particular input field is a password field. In some embodiments, the password field module 210 uses images, text, tags, labels, and/or metadata associated with a field to determine whether a particular input field is a password field. While depicted as a separate module, in one embodiment the password field module 210 is a component of the handwriting element module 202.

In some embodiments, the password field module 210 determines whether the handwriting input is associated with a password field based on the location of the handwriting input and the onscreen location of the password field. In certain embodiments, the password field module 210 determines that the handwriting input is associated with the password field when the handwriting input is within a predetermined distance of the password field. In certain embodiments, the password field module 210 determines that the handwriting input is associated with the password field when the handwriting input is closer to the password field than to another input field. In some embodiments, the password field module 210 determines whether the handwriting input is associated with a password field based on an onscreen cursor location and the onscreen location of the password field. For example, the password field module 210 may determine that the handwriting input is associated with the cursor location is within a predetermined distance of the password field.

The trigger event module 212, in one embodiment, is configured to monitor for the predetermined trigger event in response to the input replication module 204 displaying the handwriting element. In some embodiments, the trigger event is user selectable. Upon detecting the trigger event, the trigger event module 212 may signal the privacy module 206 to obscure a handwriting element associated with the trigger event.

The trigger event may include a type of event and a number of events needed to trigger. In some embodiments, the type of event includes the input of a subsequent handwriting element and/or the passage of time (e.g., the expiration of a timer). For example, the trigger event may be the input of a subsequent character, wherein the trigger event module 212 signals the privacy module 206 to obscure any previously input character responsive to detect the input of the subsequent text character. As another example, the trigger event may be the input of a threshold number of pixels, wherein the trigger event module 212 signals the privacy module 206 to obscure an oldest pixel when the threshold is reached. Thereafter, the trigger event module 212 signals the privacy module 206 to obscure an oldest pixel for each newly input pixel, thereby maintaining the number of pixels displayed at the threshold number.

In some embodiments, the trigger event is the expiration of a timer associated with the handwriting element. For example, upon expiration of a timer, the trigger event module 212 signals the privacy module 206 to obscure the handwriting element associated with the timer. Examples of handwriting elements associated with the timer include a handwriting stroke, a handwritten character or letter, or a pixel associated with the handwriting input.

In some embodiments, a timer is initiated for with the handwriting input based on a threshold amount of time, for example 500 milliseconds, and the privacy module 206 obscures pixels associated with the handwriting element upon expiration of the timer. Thus, the privacy module 206 may cause a visual effect like a cursor trail or tracer wherein pixels associated with a handwriting element are visible for the threshold amount of time before disappearing.

In some embodiments, the trigger event module 212 receives a user selection of a trigger event and monitors for the selected trigger event. In certain embodiments, the trigger event module 212 prompts the user to select a category of event and a number of events needed to trigger the privacy module 206. While depicted as a separate module, in one embodiment the trigger event module 212 is a component of the privacy module 206.

The handwriting character module 214, in one embodiment, is configured recognize a handwritten character from the handwriting input. For example, the character recognition module 214 may receive a handwritten character from the handwriting element module 202 and/or the handwriting input module 208 and perform handwriting recognition analysis to convert (e.g., translate) the handwriting elements into characters, letters, and/or symbols that are usable within a computer and/or text-processing applications. The handwriting recognition analysis may use a character recognition algorithm to identify the handwritten character as corresponding to a particular letter. In some embodiments, the character recognition module 214 includes a character recognition engine for recognizing handwritten characters. In further embodiments, the character recognition module 214 may receive user feedback to improve recognition of the handwritten characters.

In some embodiments, the character recognition module 214 is configured to provide a two-factor authentication for the handwritten password. The first factor may include verifying that a correct password is entered. The second factor may include analyzing the handwriting input to determine whether the handwriting belongs to the user associated with the credential. In some embodiments, handwriting characteristics—including handwriting style, handwriting pressure, stroke properties (e.g., length, slant, shape, etc.), and the like—are compared to a user profile associated with the user credential (e.g., a username and a password). If the password matched the user credential and the handwriting characteristics match the user profile, then the user may be authenticated.

In some embodiments, the character recognition module 214 may insert the recognized character into the password field. In other embodiments, the character recognition module 214 may forward the recognized character to the handwriting element module 202 and/or the field input module 216 for insertion into the password field. While depicted as a separate module, in one embodiment the character recognition module 214 is a component of the handwriting element module 202, the handwriting input module 208, and/or the field input module 216.

The field input module 216, in one embodiment, is configured to insert a text character into a password field, the text character corresponding to a recognized handwritten character. In some embodiments, the field input module 216 inserts the text character into a password field identified by the handwriting element module 202 and/or the password field module 210. The field input module 216 may receive a recognized text character corresponding to an input handwritten character from the handwriting element module 202 and/or the character recognition module 214 and may insert the text character into the password field.

In some embodiments, the field input module 216 obscures a previously inserted text character in response to receiving a subsequent text character. In certain embodiments, the field input module 216 obscures the previously inserted text character by replacing it with an anonymizing symbol, such as a dot, star, box, or the like. In certain embodiments, the field input module 216 obscures the text character in response to the privacy module 206 obscuring a handwriting element corresponding to the inserted text character. For example, the field input module 216 may receive a signal from the privacy module 206 and may obscure the inserted text character responsive to the signal. While depicted as a separate module, in one embodiment the field input module 216 is a component of the handwriting element module 202 and/or the privacy module 206.

The input mode module 218, in one embodiment, is configured to enable a handwriting mode for input into a password field. In some embodiments, the electronic device 101 may default to a keyboard input mode for password field input, however, the input mode module 218 may be configured to override the default and enable a handwriting mode for input into the password field. In certain embodiments, the input mode module 218 is configured to detect an input mode associated with a password field and to enable a handwriting mode for input into a password field in response to handwriting input being disabled. In some embodiments, the input mode module 218 allows the user to switch the input mode between keyboard input and handwriting input. In certain embodiments, the input mode module may also disable a virtual keyboard mode. For example, the input mode module 218 may disable the virtual keyboard so that the character recognition module may perform a two-factor authentication based on the user's handwriting.

In some embodiments, the input mode module 218 receives handwriting input and converts handwritten characters into computer-usable text. The input mode module 218 may further output the computer-usable text in a format that mimics the keyboard input mode to one or more of an operating system running on the electronic device 101 and an application corresponding to the password input field. While depicted as a separate module, in one embodiment the input mode module 218 is a component of the handwriting element module 202.

The timer module 220, in one embodiment, is configured to send an indication to the privacy module 206 when a predetermined amount of time expires. The timer module 220 may initiate a plurality of timers, each timer associated with a handwriting element, wherein the indication sent to the privacy module 206 may be a trigger event that causes the privacy module 206 to obscure the handwriting element. In certain embodiments, the element counter 222 may initiate in response to the input replication module 204 presenting the handwriting element. Examples of handwriting elements associated with the timer include a handwriting stroke, a handwritten character or letter, or a pixel associated with the handwriting input.

In some embodiments, the timer module 220 may associate a timer with the handwriting input based on a threshold amount of time, for example 500 milliseconds, and may signal the privacy module 206 to obscure pixels associated with the handwriting element. Thus, the timer module 220 may cause a visual effect like a cursor trail or tracer wherein pixels associated with a handwriting element are visible for the threshold amount of time before disappearing.

In some embodiments, the timer module 220 may associate a timer with a first identified handwriting element. For example, a first timer may be associated with a first pixel corresponding to handwriting input. Upon expiration of the timer, the timer module 220 may signal the privacy module 206 to obscure pixels associated with the first identified handwriting element. In some embodiments, the timer module 220 may initiate a second timer of lesser duration than the first timer, upon expiration of the first timer. The second timer may be associated with a next handwriting element (e.g., a next pixel) and the timer module 220 may signal the privacy module 206 to obscure the next handwriting element upon expiration of the second timer. If there are additional unobscured handwriting elements, the second timer is iteratively reset and corresponding signals are send until the privacy module 206 obscures all handwriting elements.

In some embodiments, the predetermined amount of time is user selectable. For example, during the setup of the discreet password module 200, the timer module 220 may prompt the user for an amount of time that a handwriting element is visible. The timer module 220 may then set the user response as the predetermined amount of time. While depicted as a separate module, in one embodiment the timer module 220 is a component of the privacy module 206.

The element counter module 222, in one embodiment, is configured to track a number of handwriting elements presented. In some embodiments, the element counter 222 compares the number of presented handwriting elements to a predetermined threshold and sends a trigger event to the privacy module 206 when the predetermined threshold is reached. In some embodiments, the predetermined threshold is user selectable. For example, during the setup of the discreet password module 200, the element counter 222 may prompt the user for an amount of handwriting elements to be displayed at a time. The element counter 222 may then set the user response as the predetermined threshold.

In some embodiments, the element counter 222 signals the privacy module 206 to obscure an oldest handwriting element in response to a predetermined number of handwriting elements being displayed. For example, when a threshold number of pixels corresponding to handwritten input are displayed, the element counter 222 may signal the privacy module 206 to obscure an oldest pixel each time a new pixel is displayed. As another example, after a threshold number of handwriting strokes are displayed, the element counter 222 may signal the privacy module 206 to obscure an oldest handwriting stroke. This may be particularly useful when the handwritten input associated with a password field includes an Asian character comprising a plurality of strokes, such as Chinese Hanzi, Japanese Kanji, or the like. While depicted as a separate module, in one embodiment the element counter 222 is a component of the privacy module 206.

The password reveal module 224, in one embodiment, is configured to display input handwriting elements associated with the password field in response to obscuration by the privacy module 206 and in response to user command. For example, the user may have difficulty recalling which characters of a password have been entered and may direct the password reveal module 224 to reveal the inputted handwriting elements. This may aid the user in identifying and inputting a next character in the password or to correct a previously input character. In some embodiments, the password reveal module 224 displays a "show password" box or button which, when selected, causes the display of the input handwriting elements associated with the password field. In some embodiments, the password reveal module 224 is associated with a timer and reveals the input characters only until expiration of the timer.

In some embodiments, the password reveal module 224 reveals input handwriting elements individually without displaying the all input handwriting elements at the same time. For example, the password reveal module 224 may reveal each handwriting element in the order received and for a brief period of time. In some embodiments, the password reveal module 224 only displays one handwriting element at a time. In other embodiments, the password reveal module 224 displays a plurality of handwriting elements less than the entirety of the input handwriting elements. While depicted as a separate module, in one embodiment the password reveal module 224 is a component of the privacy module 206.

FIG. 3A-3D depict a secure password handwriting device 300 for secure handwriting input for password fields, according to embodiments of the disclosure. The secure password handwriting device 300, in one embodiment, receives handwriting input associated with a password field, identifies a handwriting element from handwriting input, presents the handwriting element on a display, and obscures the handwriting element in response to a predetermined trigger event (e.g., input of a subsequent character), thereby preserving the confidentiality of the password from third-party observers. The secure password handwriting device 300 may be similar to the discreet password module 108 and/or the discreet password module 200 described above with reference to FIGS. 1 and 2.

The secure password handwriting device 300 includes a touchscreen input device 302 displaying a graphical user interface (GUI). As depicted in FIG. 3A-3D, the GUI is a welcome screen that includes username input field 304 and a password input field 306. In some embodiments, the secure password handwriting device 300 may also include one or more of a handwriting element module, an input replication module, a character recognition module, a field input module, and a privacy module, as described above with reference to FIG. 2. In the embodiments of FIGS. 3A-3D, the username is "user@domain" and the password is "abc123."

In some embodiments, the secure password handwriting device 300 receives handwriting input associated with the username field 304, performs a handwriting recognition analysis on the handwriting input, and inserts text corresponding to the handwriting input into the username field 304. In some embodiments, the secure password handwriting device 300 detects input associated with the password field 306 and determines whether a handwriting input mode is available. As certain applications and/or operating systems do not allows handwriting input for password fields, in certain embodiments the secure password handwriting device 300 enables handwriting input for the password field 306.

Figure 3B:
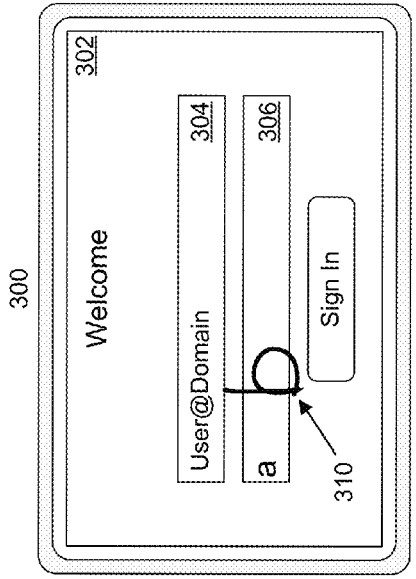
FIG. 3B is a diagram illustrating another embodiment of an apparatus for secure handwriting input for password fields.
Figure 3D:
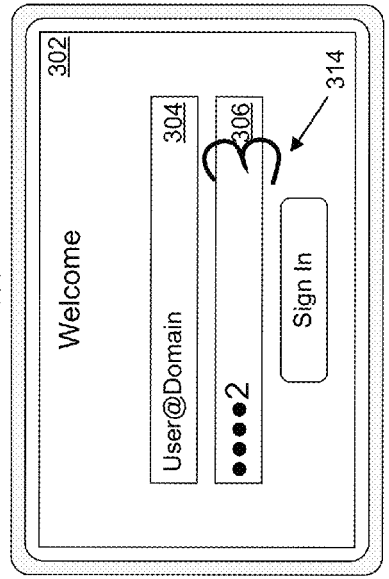
FIG. 3D is a diagram illustrating another embodiment of an apparatus for secure handwriting input for password fields.
Figure 3A:
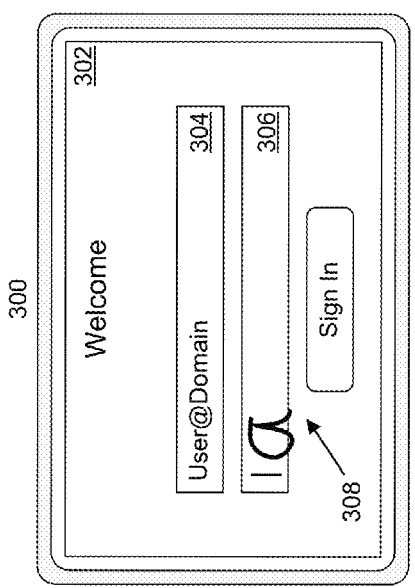
FIG. 3A is a diagram illustrating one embodiment of an apparatus for secure handwriting input for password fields.

FIG. 3A depicts the secure password handwriting device 300 after receiving handwriting input 308 for a first character of the password (e.g., a handwritten letter "a"). In some embodiments, the secure password handwriting device 300 identifies that a first character is input using time, location, pressure, or other data associated with the handwriting input. For example, the secure password handwriting device 300 may detect that an input device, such as a stylus or digital pen, has been raised after a first stroke and has been placed at an onscreen location more than a threshold distance away from the first stroke. The secure password handwriting device 300 may determine that the first stroke is associated with the password field 306 based on the onscreen location of the stylus or digital pen compared to the location of the password field 306 and/or based on a cursor location coinciding with the location of the password field 306. At this point, the secure password handwriting device 300 may identify the first stroke as a first handwriting element and perform a handwriting recognition analysis on the first stroke. In this embodiment, the secure password handwriting device 300 may recognize the handwriting input 308 for the first character as corresponding to the letter "a."

FIG. 3B depicts the secure password handwriting device 300 after receiving handwriting input 310 for a second character of the password (e.g., a handwritten letter "b"). As with the handwriting input 308 for the first character, the secure password handwriting device 300 identifies that handwriting input 310 for the second character is input using time, location, pressure, or other data associated with the handwriting input. Here, the secure password handwriting device 300 recognizes the input of a subsequent character (e.g., the handwriting input 310 for the second character) as a trigger event and obscures the handwriting input 308 for the first character. Additionally, the secure password handwriting device 300 may identify the second stroke as a second handwriting element and perform a handwriting recognition analysis on the second stroke. In the depicted embodiment, the secure password handwriting device 300 has inserted the letter corresponding to the handwriting input 308 for the first character into the password field 306, but has not yet obscured the letter "a" in the password field 306. In other embodiments, the secure password handwriting device 300 obscures the letter "a" in the password field 306 and the handwriting input 308 for the first character in a synchronous manner (e.g., simultaneously or after an offset amount of time). Note that the secure password handwriting device 300 does not obscure the handwriting input 310 for the second character at this time as a trigger event corresponding to the handwriting input 310 for the second character is not yet received.

Figure 3C:
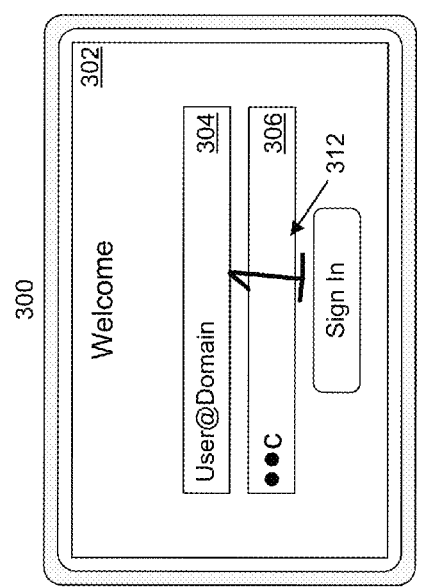
FIG. 3C is a diagram illustrating another embodiment of an apparatus for secure handwriting input for password fields.

FIG. 3C depicts the secure password handwriting device 300 after receiving handwriting input 312 for a fourth character of the password (e.g., a handwritten number "1"). The secure password handwriting device 300 may identifies that handwriting input 310 for the fourth character is input using time, location, pressure, or other data associated with the handwriting input. Here, the secure password handwriting device 300 recognizes the input of a subsequent character (e.g., the handwriting input 310 for the fourth character) as a trigger event and obscures previously received handwriting input. Additionally, the secure password handwriting device 300 has identified and inserted into the password field 306 three previously input text characters corresponding to the password (e.g., the characters "abc") and, as depicted, has obscured the first two text characters inserted into the password field 306.

The secure password handwriting device 300 may identify two handwriting strokes as belonging to the same handwriting element and perform a handwriting recognition analysis on the handwriting element (e.g., the handwritten number "1"). The secure password handwriting device 300 may identify the handwriting strokes as belonging to the same character based on location, time, and/or acceleration data associated with the handwriting input 310 for the fourth character. The secure password handwriting device 300 does not obscure the handwriting input 310 for the fourth character at this time as a trigger event corresponding to the handwriting input 310 for the fourth character is not yet received.

FIG. 3D depicts the secure password handwriting device 300 after receiving handwriting input 314 for a last character of the password (e.g., a handwritten number "3"). Here, the secure password handwriting device 300 recognizes the input of a subsequent character (e.g., the handwriting input 310 for the last character) as a trigger event and obscures previously received handwriting input. Additionally, the secure password handwriting device 300 has identified and inserted into the password field 306 five previously input text characters corresponding to the password (e.g., the characters "abc12") and, as depicted, has obscured the first four text characters inserted into the password field 306. In the embodiment of FIG. 3D, the secure password handwriting device 300 provides context to the user by not obscuring the fifth text character. In other embodiments, the secure password handwriting device 300 obscures the text characters and the handwriting elements corresponding to the text characters in a synchronous manner (e.g., simultaneously, or after an offset amount of time).

FIG. 3E-3H depict a secure password handwriting device 350 for secure handwriting input for password fields, according to embodiments of the disclosure. The secure password handwriting device 350, in one embodiment, receives handwriting input associated with a password field, identifies a handwriting element from handwriting input, presents the handwriting element on a display, and obscures the handwriting element in response to a predetermined trigger event (e.g., expiration of a predetermined amount of time), thereby preserving the confidentiality of the password from third-party observers. The secure password handwriting device 350 may be similar to the discreet password module 108, the discreet password module 200, and/or the secure password handwriting device 300 described above with reference to FIGS. 1-2 and 3A-3D.

The secure password handwriting device 350 includes a touchscreen input device 302 displaying a graphical user interface (GUI). As depicted in FIG. 3E-3H, the GUI is a welcome screen that includes username input field 304 and a password input field 306. In some embodiments, the secure password handwriting device 350 may also include one or more of a handwriting element module, an input replication module, a character recognition module, a field input module, and a privacy module, as described above with reference to FIG. 2. In the embodiments of FIGS. 3E-3H, the username is "user@domain" and the password is "abc123."

In some embodiments, the secure password handwriting device 350 detects input associated with the password field 306 and determines whether a handwriting input mode is available. As certain applications and/or operating systems do not allows handwriting input for password fields, in certain embodiments the secure password handwriting device 350 enables handwriting input for the password field 306.

Figure 3E:
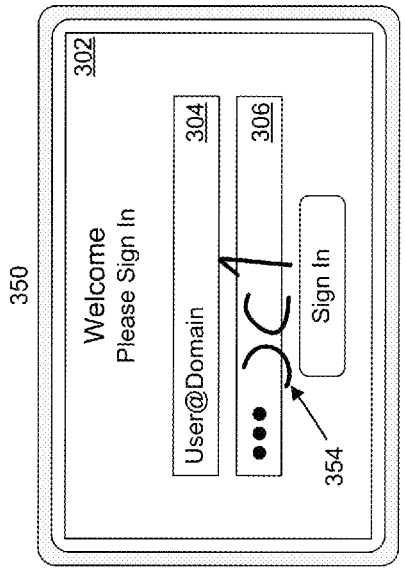
FIG. 3E is a diagram illustrating another embodiment of an apparatus for secure handwriting input for password fields.

FIG. 3E depicts the secure password handwriting device 350 after receiving handwriting input 352 for first and second characters of the password (e.g., a handwritten letters "a" and "b"). In some embodiments, the secure password handwriting device 350 initiates a timer upon receiving the first pixels corresponding to the handwriting input. The secure password handwriting device 350 then begins to obscure the oldest pixels upon expiration of the timer. As depicted, the timer has expired and obscuration has begun by the time the user finished inputting the handwritten letter "b." As handwriting input is received, characters are recognized within the handwriting input. Text characters corresponding to the handwriting input are inserted into the password field 306, as shown, and displayed as anonymous symbols (e.g., as dots).

In some embodiments, the secure password handwriting device 300 may associate a timer with the handwriting input based on a threshold amount of time and may obscure pixels associated with the handwriting element upon expiration of the timer. Thus, the secure password handwriting device 300 may cause a visual effect like a cursor trail or tracer wherein pixels associated with a handwriting element are visible for the threshold amount of time, for example 500 milliseconds, before disappearing.

Figure 3F:
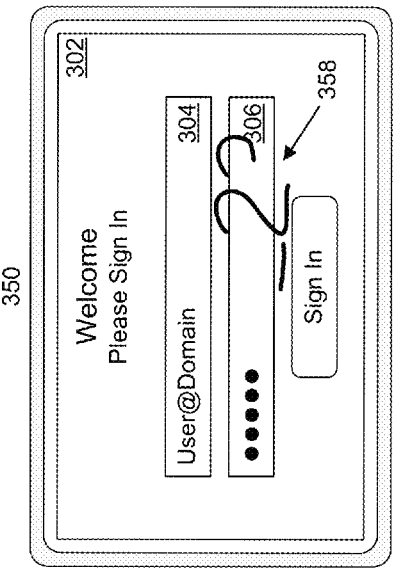
FIG. 3F is a diagram illustrating another embodiment of an apparatus for secure handwriting input for password fields.

FIG. 3F depicts the secure password handwriting device 350 while receiving handwriting input 354 for a fourth character of the password (e.g., a handwritten number "1"). In certain embodiments, the secure password handwriting device 350 initiates a new timer as each handwriting element is identified. For example, a timer may be associated with each pixel of the handwriting input. In other embodiments, the secure password handwriting device 350 associates a single timer with the handwriting input and obscures an oldest pixel at predetermined intervals after the expiration of the timer. For example, a two-second timer may be associated with a first pixel and the first pixel may be obscured responsive to expiration of the timer. A second pixel is obscured a predetermined interval after the first pixel is obscured, for example 10 milliseconds after the first pixel. Subsequently received pixels may be obscured at the same predetermined interval after a previous pixel is obscured.

Figure 3G:
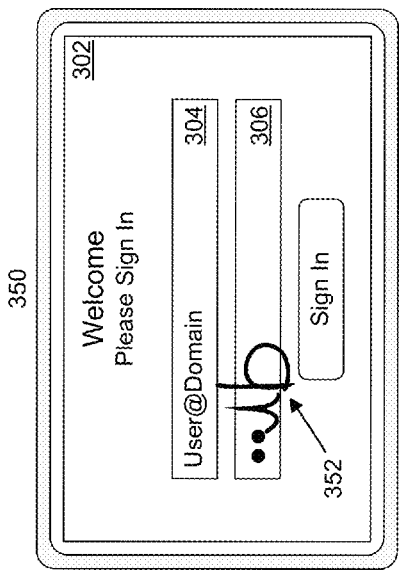
FIG. 3G is a diagram illustrating another embodiment of an apparatus for secure handwriting input for password fields.

FIG. 3G depicts the secure password handwriting device 350 while receiving handwriting input 356 for a fifth character of the password (e.g., a handwritten number "2"). Here, the secure password handwriting device 350 recognizes a previously input character (e.g., the number "1") and inserts the recognized character into the password field 306. The secure password handwriting device 350 may identify two handwriting strokes as belonging to the same handwriting element and perform a handwriting recognition analysis on the handwriting element (e.g., the handwritten number "1"). The secure password handwriting device 350 may identify the handwriting strokes as belonging to the same character based on location, time, and/or acceleration data associated with the handwriting input 310 for the fourth character. Additionally, the secure password handwriting device 350 has obscured previously received handwriting input in response to expiration of the timer.

Figure 3H:
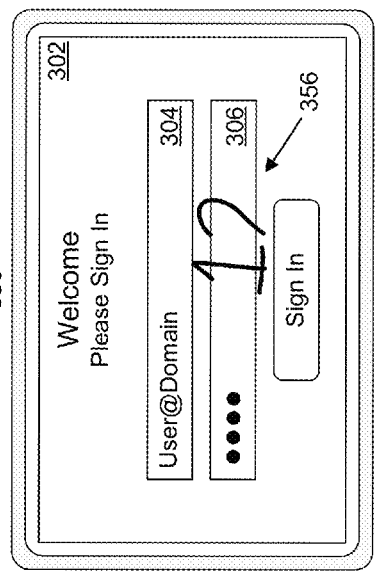
FIG. 3H is a diagram illustrating another embodiment of an apparatus for secure handwriting input for password fields.

FIG. 3H depicts the secure password handwriting device 350 while receiving handwriting input 314 for a last character of the password (e.g., a handwritten number "3"). Here, the secure password handwriting device 350 recognizes previously input character (e.g., the number "2") and inserts the recognized character into the password field 306. Additionally, the secure password handwriting device 350 has obscured previously received handwriting input in response to expiration of the timer. While the timer is described above as associated with a pixel, in other embodiments, the timer may be associated with a stroke, letter, or other character as each handwritten character is identified. For example, a timer may be associated with each of the received characters "a," "b," "c," "1," and "2" with the secure password handwriting device 300 obscuring pixels of each character, such as from oldest to newest, in response to expiration of that character's timer.

Figure 4:
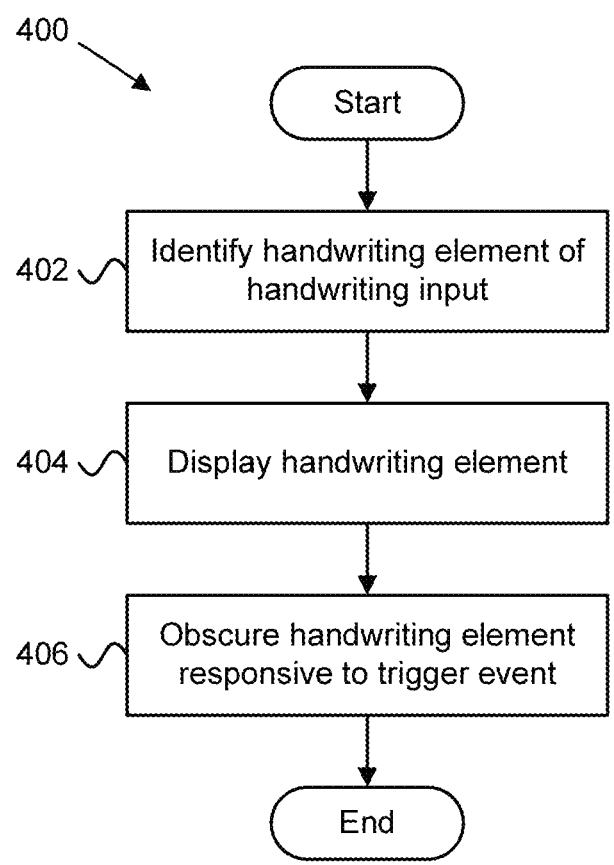
FIG. 4 is a schematic flow chart diagram illustrating one embodiment of a method for secure handwriting input for password fields.

FIG. 4 depicts a method 400 for secure handwriting input for password fields, according to embodiments of the disclosure. In some embodiments, the method 400 is performed using a discreet password handwriting device, such as the discreet password module 108, the discreet password module 200, the secure password handwriting device 300, and/or the secure password handwriting device 350 described above with reference to FIGS. 1-2 and 3A-3H. In some embodiments, the method 400 is performed by a processor, such as a microcontroller, a microprocessor, a central processing unit (CPU), a graphics processing unit (GPU), an auxiliary processing unit, a FPGA, or the like.

The method 400 begins with the discreet password handwriting device identifying 402 a handwriting element of handwriting input associated with a password field. In some embodiments, a user may input the handwriting input via a digital pen, via a stylus and touch-sensitive panel (e.g., a touchscreen), or via another suitable handwriting input device. The handwriting input may be analyzed to identify 402 one or more handwriting elements within the handwriting input.

In some embodiments, identifying 402 a handwriting element includes analyzing location, time, and/or pressure data associated with the handwriting input to distinguish one handwriting element from another. In some embodiments, the handwriting element includes a handwritten stroke. In other embodiments, the handwriting element includes a handwritten character, such as a letter or number.

In some embodiments, identifying 402 a handwriting element includes identifying one or more pixels corresponding to strokes, lines, marks, characters, and/or letters of the handwritten input. The pixels form a digital image corresponding to locations on the input device where handwriting input was received. In certain embodiments, identifying 402 a handwriting element includes mapping a pixel of the handwriting input to an onscreen location.

The discreet password handwriting device then displays 404 the handwriting element, for example, on the display 106. In certain embodiments, displaying 404 the handwriting element includes replicates the location of handwriting input with respect to a displayed interface, such as a graphical user interface (GUI). For example, where the display device 106 comprises a touchscreen, displaying 404 the handwriting element may include displaying one or more pixels corresponding to each location on the touchscreen where handwriting input is received.

The discreet password handwriting device then obscures 406 the handwriting element responsive to a trigger event. In some embodiments, the trigger event is predetermined by a provider of the discreet password handwriting device. In some embodiments, the trigger event may be user selectable. The trigger event may include a type of event and a number of events needed to trigger. In some embodiments, the type of event includes the input of a subsequent handwriting element and/or the passage of time (e.g., the expiration of a timer).

In some embodiments, obscuring 406 the handwriting element includes changing a color of the handwriting element to match a background color. For example, the handwriting element may be rendered transparent to the background. In some embodiments, obscuring 406 the handwriting element includes replacing the handwriting element and an area surrounding the handwriting element with a colored area. The replaced area, in one embodiment, may sufficient in size to render the handwriting element unintelligible to an observer. In some embodiments, obscuring 406 the handwriting element includes replacing the handwriting element with an anonymizing symbol. In some embodiments, obscuring 406 the handwriting element includes removing the handwriting element from the display.

In some embodiments, obscuring 406 the handwriting element includes fading the handwriting element in steps until a replicated handwriting element is no longer visible against the background. In some embodiments, the fading comprises few steps such that the fade occurs quickly. In other embodiments, the fading comprises many steps such that the fade occurs slowly. The method 400 ends.

Figure 5:
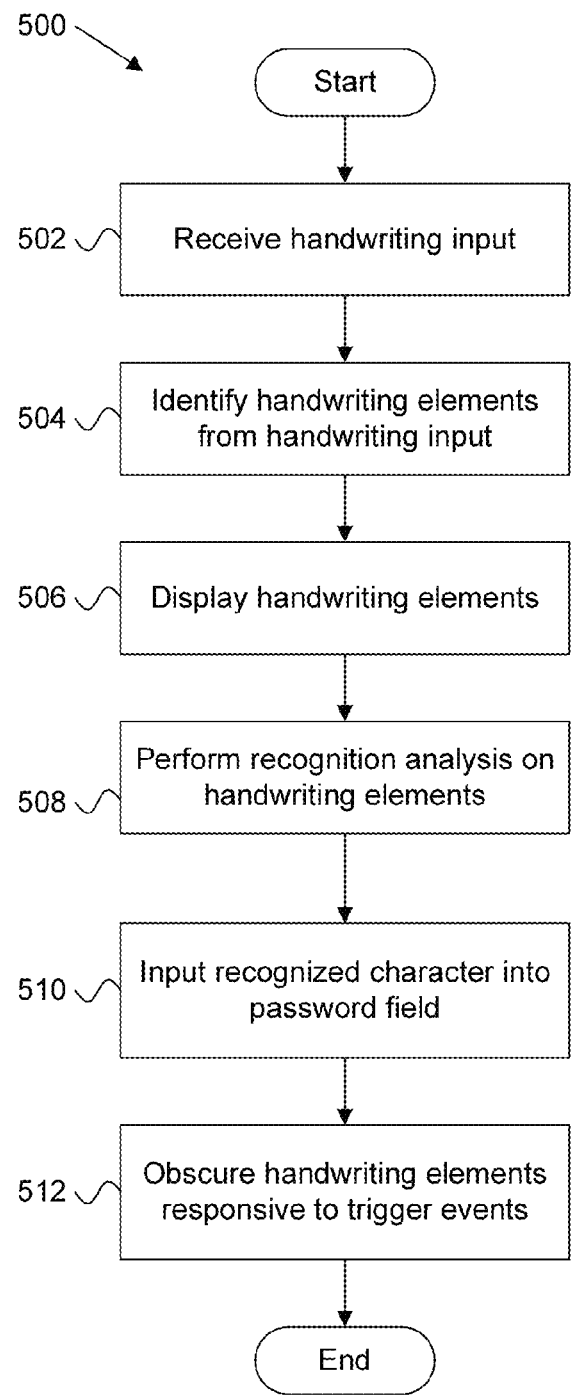
FIG. 5 is a schematic flow chart diagram illustrating another embodiment of a method for secure handwriting input for password fields.

FIG. 5 depicts a method 500 for secure handwriting input for password fields, according to embodiments of the disclosure. In some embodiments, the method 500 is performed using a discreet password handwriting device, such as the discreet password handwriting device 108, the discreet password module 200, and/or the secure password handwriting device 300 described above with reference to FIGS. 1-2 and 3A-3D. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins with the discreet password handwriting device receiving 502 handwriting input. For example, a user may input the handwriting input via a digital pen, via a stylus and touch-sensitive panel (e.g., a touchscreen), or via another suitable handwriting input device. In some embodiments, the input text is received 502 using a text module (e.g., the handwriting input module 208). In certain embodiments, the input text is received 502 directly from an input device (e.g., the input device 104). In certain embodiments, the input text is received 502 from a processor (e.g., the processor 102) or another controller. In further embodiments, the input text may be received 602 from a networked device via the processor or controller.

The discreet password handwriting device then identifies 504 one or more handwriting elements within handwriting input associated with a password field. In some embodiments, the handwriting input is associated with the password field based on the location of the handwriting input and the location of the password field.

In some embodiments, identifying 504 a handwriting element includes analyzing location, time, and/or pressure data associated with the handwriting input to distinguish one handwriting element from another. In some embodiments, the handwriting element includes a handwritten stroke. In other embodiments, the handwriting element includes a handwritten character, such as a letter or number.

In some embodiments, identifying 504 a handwriting element includes identifying one or more pixels corresponding to strokes, lines, marks, characters, and/or letters of the handwritten input. The pixels form a digital image corresponding to locations on the input device where handwriting input was received. In certain embodiments, identifying 504 a handwriting element includes mapping a pixel of the handwriting input to an onscreen location.

The discreet password handwriting device then displays 506 the handwriting elements, for example, on the display 106. In certain embodiments, displaying 506 the handwriting element includes replicates the location of handwriting input with respect to a displayed interface, such as a graphical user interface (GUI). For example, where the display device 106 comprises a touchscreen, displaying 506 the handwriting element may include displaying one or more pixels corresponding to each location on the touchscreen where handwriting input is received.

The discreet password handwriting device then performs 508 a recognition analysis on the one or more handwriting elements. In one embodiment, performing 508 a recognition analysis includes converting (e.g., translating) the handwriting elements into characters, letters, and/or symbols that are usable within a computer and/or text-processing applications. Performing 508 the recognition analysis may use a character recognition algorithm to identify a particular letter corresponding to the handwritten character.

The discreet password handwriting device then inputs 510 a recognized character into the password field. In some embodiments, inputting 510 the recognized character includes inserting the recognized character after a previously inserted character in the password field. In some embodiments, inputting 510 the recognized character includes obscuring a previously inserted text character in response to receiving a subsequent text character. Obscuring the previously inserted character may include replacing the character with an anonymizing symbol, such as a dot, star, box, or the like.

The discreet password handwriting device then obscures 512 the handwriting element responsive to a trigger event. In some embodiments, the trigger event is predetermined by a provider of the discreet password handwriting device. In some embodiments, the trigger event may be user selectable. The trigger event may include a type of event and a number of events needed to trigger. In some embodiments, the type of event includes the input of a subsequent handwriting element and/or the passage of time (e.g., the expiration of a timer).

In some embodiments, obscuring 512 the handwriting element includes changing a color of the handwriting element to match a background color. For example, the handwriting element may be rendered transparent to the background. In some embodiments, obscuring 512 the handwriting element includes replacing the handwriting element and an area surrounding the handwriting element with a colored area. The replaced area, in one embodiment, may sufficient in size to render the handwriting element unintelligible to an observer. In some embodiments, obscuring 512 the handwriting element includes replacing the handwriting element with an anonymizing symbol. In some embodiments, obscuring 512 the handwriting element includes removing the handwriting element from the display.

In some embodiments, obscuring 512 the handwriting element includes fading the handwriting element in steps until a replicated handwriting element is no longer visible against the background. In some embodiments, the fading comprises few steps such that the fade occurs quickly. In other embodiments, the fading comprises many steps such that the fade occurs slowly. The method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
an input device operatively coupled to the processor and configured to receive handwriting input from a user;
a display operatively coupled to the processor;
a memory that stores code executable by the processor to:
identify a handwriting element from the handwriting input received via the input device, wherein the handwriting element comprises an element selected from the group consisting of:
a handwriting stroke, a handwritten character, and a pixel corresponding to the handwriting input;
control the display to present the handwriting element;
recognize a first handwritten character from the handwriting input;
insert a password field, a text character corresponding to the first handwritten character;
control the display to present the text character in the password field;
track a number of handwriting elements subsequently presented;
control display to obscure the handwriting element in response to determining that a predetermined number of subsequent handwriting elements have been presented; and
control the display to obscure one or more previously entered text characters in response to obscuring the handwriting element.

2. The apparatus of claim 1, wherein the processor further:
receives the handwriting input; and
determines whether the handwriting input is associated with a password field.

3. The apparatus of claim 1, wherein the processor obscures one or more previously entered text characters in response to inserting a subsequent text character into the password field.

4. The apparatus of claim 1, wherein the processor determines whether a continuous stroke of the handwriting input comprises more than one handwritten character.

5. The apparatus of claim 1, wherein the processor further enables a handwriting mode for input into the password field.

6. The apparatus of claim 1, wherein the processor further initiates a timer in response to controlling the display to present the handwriting element and controls the display to obscure the handwriting element in response to expiration of the timer.

7. The apparatus of claim 1, wherein the processor controls the display to obscure the handwriting element by performing an action selected from the group consisting of: removing the handwriting element, rendering transparent the handwriting element, replacing the handwriting element and an area surrounding the handwriting element with a colored area, and replacing the handwriting element with an anonymizing symbol.

8. The apparatus of claim 1, wherein the processor obscures the text character a predetermined period after obscuring the handwriting element corresponding to the text character.

9. A method comprising:
identifying, by use of a processor, a handwriting element based on handwriting input for a password field;
displaying the handwriting element on a display, wherein the handwriting element comprises an element selected from the group consisting of: a handwriting stroke, a handwritten character, and a pixel corresponding to the handwriting input;
recognizing a first handwritten character corresponding to the handwriting input;
inputting, into the password field, a text character corresponding to the first handwritten character;
displaying the text character in the password field;
tracking a number of handwriting elements subsequently displayed;
controlling the display to obscure the handwriting element in response to determining that a predetermined number of subsequent handwriting elements have been presented; and
controlling the display to obscure one or more previously entered text characters in response to obscuring the handwriting element.

10. The method of claim 9, further comprising obscuring the text character a predetermined period after obscuring the handwriting element corresponding to the text character.

11. The method of claim 9, wherein controlling the display to obscure the handwriting element comprises controlling the display to perform an action selected from the group consisting of: removing the handwriting element, rendering transparent the handwriting element, replacing the handwriting element and an area surrounding the handwriting element with a colored area, and replacing the handwriting element with an anonymizing symbol.

12. The method of claim 9, further comprising obscuring the handwriting element after passage of a predetermined amount of time.

13. The method of claim 9, wherein identifying the handwriting element based on the handwriting input for the password field comprises:
receiving the handwriting input from an input device; and
determining whether the handwriting input is associated with the password field.

14. The method of claim 9, further comprising obscuring one or more previously entered text characters in response to inputting a subsequent text character.

15. The method of claim 9, further comprising determining whether a continuous stroke of the handwriting input comprises more than one handwritten character.

16. The method of claim 9, further comprising enabling a handwriting mode for input into the password field.

17. A program product comprising a non-transitory computer readable storage medium that stores code executable by a processor to perform:
receiving handwriting input for a password field;

identifying a handwriting element based on the handwriting input for a password field, wherein the handwriting element comprises an element selected from the group consisting of: a handwriting stroke, a handwritten character, and a pixel corresponding to the handwriting input;

displaying the handwriting element on a display;

recognizing a first handwritten character corresponding to the handwriting input;

inputting, into the password field, a text character corresponding to the first handwritten character;

displaying the text character in the password field;

tracking a number of handwriting elements subsequently displayed; and controlling the display to obscure the handwriting element in response to determining that a predetermined number of subsequent handwriting elements have been presented; and controlling the display to obscure one or more previously entered text characters in response to obscuring the handwriting element.

18. The program product of claim 17, wherein the code further comprises obscuring the text character a predetermined period after obscuring the handwriting element corresponding to the text character.

19. The program product of claim 17, wherein the code further comprises:

enabling a handwriting mode for input into the password field;

receiving the handwriting input from an input device; and determining whether the handwriting input is associated with the password field.

20. The program product of claim 17, further comprising obscuring one or more previously entered text characters in response to inputting a subsequent text character.

* * * * *